(12) United States Patent
Satpathy et al.

(10) Patent No.: US 10,158,485 B2
(45) Date of Patent: Dec. 18, 2018

(54) DOUBLE AFFINE MAPPED S-BOX HARDWARE ACCELERATOR

(71) Applicant: Intel Corporation, Santa Clara, CA (US)

(72) Inventors: Sudhir K. Satpathy, Hillsboro, OR (US); Sanu K. Mathew, Hillsboro, OR (US); Vinodh Gopal, Westborough, MA (US); Kirk S. Yap, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 105 days.

(21) Appl. No.: 14/863,769

(22) Filed: Sep. 24, 2015

(65) Prior Publication Data

US 2017/0093571 A1   Mar. 30, 2017

(51) Int. Cl.
    *H04L 9/10* (2006.01)
    *G09C 1/00* (2006.01)
    *H04L 9/06* (2006.01)
    *G06F 7/72* (2006.01)

(52) U.S. Cl.
    CPC .............. *H04L 9/10* (2013.01); *G06F 7/726* (2013.01); *G09C 1/00* (2013.01); *H04L 9/0631* (2013.01); *H04L 2209/12* (2013.01); *H04L 2209/125* (2013.01)

(58) Field of Classification Search
    CPC .............................. H04L 9/10; H04L 2209/12
    USPC ..................................... 380/28, 255; 713/168
    See application file for complete search history.

(56) References Cited

U.S. PATENT DOCUMENTS

| 9,910,792 | B2 | 3/2018 | Satpathy | |
|---|---|---|---|---|
| 2006/0109981 | A1 | 5/2006 | Sexton | |
| 2009/0003589 | A1 | 1/2009 | Mathew et al. | |
| 2009/0279688 | A1* | 11/2009 | Michaels | H04L 9/0668 380/28 |
| 2010/0046745 | A1 | 2/2010 | Hanatani et al. | |
| 2010/0074440 | A1 | 3/2010 | Lee et al. | |
| 2010/0232597 | A1* | 9/2010 | Lu | H04L 9/0625 380/28 |

(Continued)

FOREIGN PATENT DOCUMENTS

KR    1020100059571 A    6/2010

OTHER PUBLICATIONS

PCT Notification of Transmittal of the International Search Report and the Written Opinion of the International Searching Authority for PCT Application No. PCT/US2016/046905, dated Dec. 7, 2016, 28 pages.

(Continued)

*Primary Examiner* — Ashok Patel
*Assistant Examiner* — Quazi Farooqui
(74) *Attorney, Agent, or Firm* — Lowenstein Sandler LLP

(57) ABSTRACT

A processing system includes a memory and a cryptographic accelerator module operatively coupled to the memory, the cryptographic accelerator module employed to implement a byte substitute operation by performing: a first mapped affine transformation of an input bit sequence to produce a first intermediate bit sequence, an inverse transformation of the first intermediate bit sequence to produce a second intermediate bit sequence, and a second mapped affine transformation of the second intermediate bit sequence to produce an output bit sequence.

14 Claims, 16 Drawing Sheets

(56) References Cited

U.S. PATENT DOCUMENTS

| | | |
|---|---|---|
| 2013/0236005 A1 | 9/2013 | Ikeda et al. |
| 2014/0169553 A1* | 6/2014 | Chen .................... G06F 7/724 380/28 |
| 2015/0067302 A1 | 3/2015 | Gueron |
| 2015/0086007 A1 | 3/2015 | Mathew et al. |
| 2015/0341168 A1 | 11/2015 | Gueron |

OTHER PUBLICATIONS

Wang et al., "Application of the Composite Field in the Design of an Improved AES S-box Based on Inversion," 7 pages, 2014.

Mathew et al., "53 Gbps Native GF(24)2Composite-Field AES-Encrypt/Decrypt Accelerator for Content-Protection in 45 nm High-Performance Microprocessors," 10 pages, Apr. 2011.

Mathew et al., "340mV-1.1V, 289Gbps/W, 2090-gate NanoAES Hardware Accelerator with Area-optimized Encrypt/Decrypt GF(24)2 Polynomials in 22nm tri-gate CMOS," pp. 146-147, 2014.

Intel Corporation, Shay Gueron, "Intel® Advanced Encryption Standard (AES) New Instructions Set", Revision 3.0, 81 pages, May 2010.

International Search Report and Written Opinion for PCT/US2017/022152, dated Jun. 13, 2017, 13 pages.

USPTO, Office Action for U.S. Appl. No. 15/095,783, dated Aug. 11, 2017.

USPTO, Notice of Allowance for U.S. Appl. No. 15/095,783, dated Oct. 25, 2017.

\* cited by examiner $$\text{Sbox}(x) = A_2(A_1 \cdot x + C_1)^{-1} + C_2$$

302 $A_1 = A_2 = \begin{bmatrix} 1 & 1 & 0 & 1 & 0 & 0 & 1 & 1 \\ 1 & 1 & 1 & 0 & 1 & 0 & 0 & 1 \\ 1 & 1 & 1 & 1 & 0 & 1 & 0 & 0 \\ 0 & 1 & 1 & 1 & 1 & 0 & 1 & 0 \\ 0 & 0 & 1 & 1 & 1 & 1 & 0 & 1 \\ 1 & 0 & 0 & 1 & 1 & 1 & 1 & 0 \\ 0 & 1 & 0 & 0 & 1 & 1 & 1 & 1 \\ 1 & 0 & 1 & 0 & 0 & 1 & 1 & 1 \end{bmatrix}$ 304 $C_1 = C_2 = \begin{bmatrix} 1 \\ 1 \\ 0 \\ 1 \\ 0 \\ 0 \\ 1 \\ 1 \end{bmatrix}$ 306 $f(x) = x^8 + x^7 + x^6 + x^5 + x^4 + x^2 + 1$

FIG. 3

$$\underline{502A} \quad MA_1 = \begin{bmatrix} 1&0&0&0&0&1&1&1 \\ 1&0&0&1&0&1&1&0 \\ 0&0&0&0&1&0&0&0 \\ 0&1&0&0&0&0&1&0 \\ 0&1&0&0&0&0&0&0 \\ 1&0&1&0&1&1&0&0 \\ 1&1&1&1&1&0&1&1 \\ 1&1&0&1&0&0&1&1 \end{bmatrix} \quad \underline{502B} \quad A_2M^{-1} = \begin{bmatrix} 0&0&0&1&0&0&1&1 \\ 0&1&0&1&0&1&1&1 \\ 1&0&0&0&0&0&1&0 \\ 1&0&0&1&0&1&1&1 \\ 0&1&1&0&1&0&0&0 \\ 1&1&0&1&1&0&0&0 \\ 1&0&0&0&0&0&0&1 \\ 0&1&0&0&1&0&1&1 \end{bmatrix} \quad \underline{504} \quad MC_1 = \begin{bmatrix} 1 \\ 0 \\ 0 \\ 1 \\ 1 \\ 0 \\ 0 \\ 0 \end{bmatrix}$$

910 Identify a first plurality of irreducible polynomials associated with a finite-prime field, such that each identified polynomial has primitive roots in the finite-prime field

920 Identify a second plurality of irreducible polynomials associated with a composite-field of the finite-prime field, such that each identified polynomial has primitive roots in the composite-field

930 Identify a plurality of composite-field elements, such that the identified composite-field element represents a root of a reduction polynomial associated with the finite-prime field

940 Generate, using the identified plurality of composite-field elements, a plurality of mapping matrices and associated mapped affine matrices

950 Identify an S-box implementation using a mapping matrix of the generated plurality of mapping matrices, such that the identified S-box implementation has the minimal area design

FIG. 9

DOUBLE AFFINE MAPPED S-BOX HARDWARE ACCELERATOR

TECHNICAL FIELD

This disclosure is related generally to computing devices and more specifically to computing devices for performing cryptographic operations.

BACKGROUND

Cryptographic methods may be used to protect confidential information in computer systems and other electronic devices. For example, an encryption operation may be performed, in which a series of transformations as specified by a chosen cryptographic algorithm are performed on a plaintext input data (e.g., a sequence of bits representing text, numbers, intelligible characters, etc.) using an encryption key (e.g., a sequence of bits) to produce encrypted data (cipher text). It is generally practically unfeasible to determine the unencrypted plaintext data from the encrypted data, without knowing the cryptographic key. If the cryptographic key is known, a decryption (sometimes referred to as inverse cipher) operation may be performed on the encrypted data to reproduce the corresponding plaintext (unencrypted data).

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 schematically illustrates example transformation matrices that may be employed to implement an S-box in accordance with one or more aspects of the present disclosure;

FIG. 5 schematically illustrates example merged transformation matrices that may be employed to implement an S-box in accordance with one or more aspects of the present disclosure;

FIG. 9 depicts a flow diagram of an example method 900 for identifying an S-box implementation having an optimal area design, in accordance with one or more aspects of the present disclosure;

DETAILED DESCRIPTION

Figure 1:
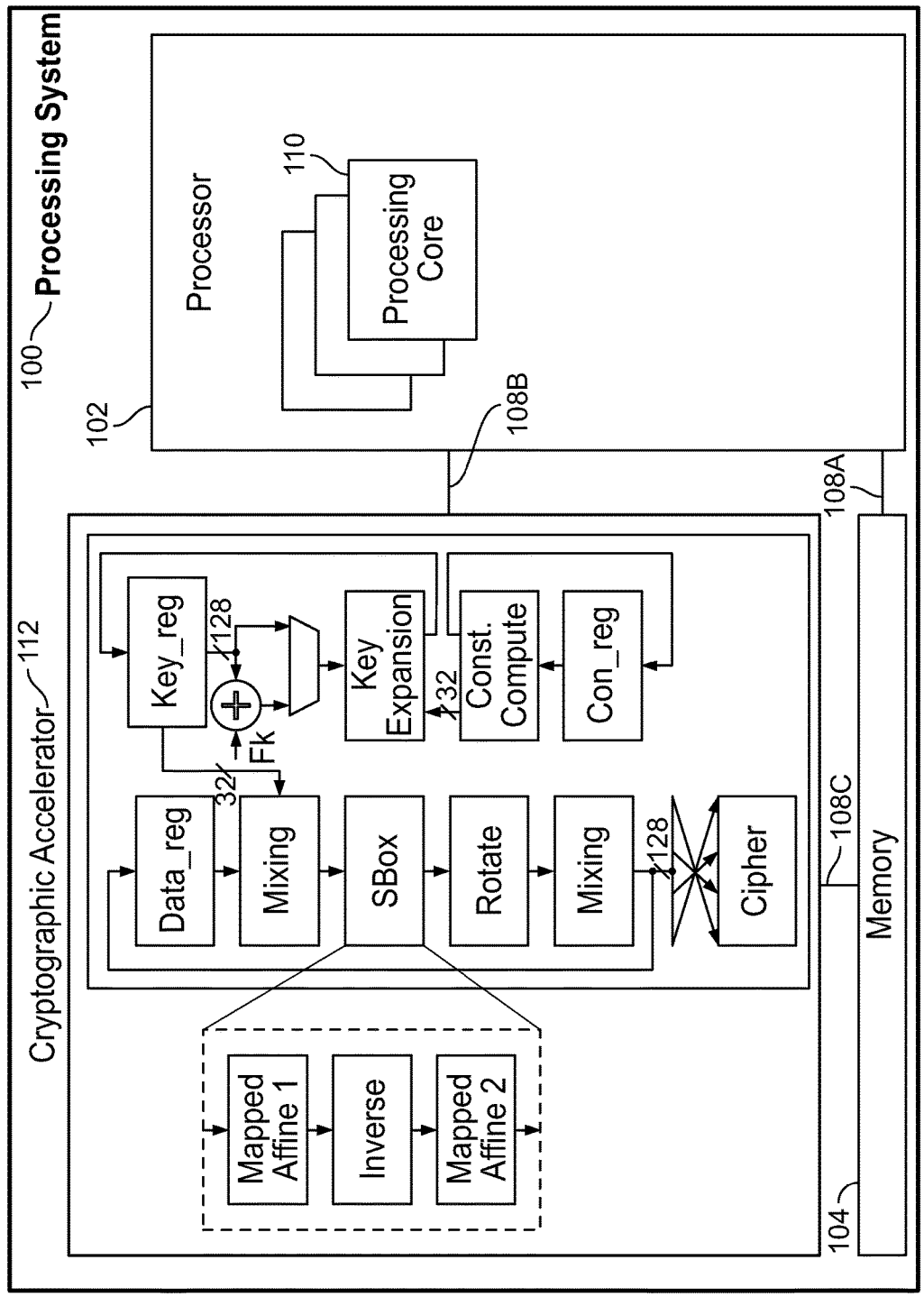
FIG. 1 schematically illustrates a processing system that may be employed to perform cryptographic operations, in accordance with one or more aspects of the present disclosure.

"Cryptographic operation" herein shall refer to a data processing operation involving secret parameters (e.g., encryption/decryption operations using secret keys). "Cryptographic data processing system" herein shall refer to a data processing system (e.g., a general purpose or specialized processor, a system-on-chip, or the like) that is employed for performing cryptographic operations.

A cryptographic method, such as Advanced Encryption Standard (AES) or SMS4, may perform several iterations (also referred to as "rounds") to transform, using an encryption key, a plaintext data into an encrypted cipher text. Each round may comprise a sequence of arithmetic, logical, or byte permutations operations performed on an input state using a round key which is derived from the encryption key. The resulting state of each but the last round may then be utilized as the input state of the subsequent round.

The computational complexity of mapping such arithmetic, logical, or byte permutation operations onto general-purpose microprocessors, combined with high data rates of real-time media processing and memory encryption may create power and performance bottlenecks within the processor core. Aspects of the present disclosure address this and other deficiencies by disclosing systems (such as hardware accelerators) and methods for performing non-linear data processing operations using composite Galois fields.

In an illustrative example, at each round of a cryptographic operation, certain bits of the round key may be mixed with at least subset of the round state, and the result may be by a substitution module commonly referred to as an S-box. The output of the S-box may be rotated, and subsequently mixed with the round state to create an intermediate output that would repeatedly go through round iterations. Following the final round, the four state bytes may be are used to generate the final cipher output.

In certain implementations, the input and output of the S-box may be represented by elements of a Galois field $GF(2^8)$, which may be viewed as a set of 256 8-bit integers with certain operations defined on those integers.

In accordance with one or more aspects of the present disclosure, the S-box may be implemented by performing a double-affine transform with an intervening inverse operation, as described in more details herein below. Various aspects of the above referenced methods and systems are described in more details herein below by way of examples, rather than by way of limitation.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation in order to provide a thorough understanding of the present disclosure. It will be apparent, however, to one skilled in the art that these specific details need not be employed to practice the methods disclosed herein. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Although the following examples are described with reference to a processor, other implementations are applicable to other types of integrated circuits and logic devices. Similar techniques and teachings of examples described herein can be applied to other types of circuits or semiconductor devices that can benefit from higher pipeline throughput and improved performance. The teachings of examples described herein are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed.

The examples illustrating the present disclosure and accompanied drawings should not be construed in a limiting sense as they are merely intended to provide examples of embodiments described herein rather than to provide an exhaustive list of all possible implementations of embodiments described herein. Although the below examples describe instruction handling and distribution in the context of execution units and logic circuits, other implementations of the systems and methods described herein can be accomplished by way of a data or instructions stored on a machine-readable, tangible medium, which when performed by a machine cause the machine to perform functions consistent with at least one embodiment described herein. In certain implementations, functions associated with embodiments described herein are embodied in machine-executable instructions. The instructions can be used to cause a general-purpose or special-purpose processor that is programmed with the instructions to perform the methods described herein. Implementations described herein may be provided as a computer program product or software which may include a machine or computer-readable medium having stored thereon instructions which may be used to program a computer (or other electronic devices) to perform one or more operations according to embodiments described herein. Alternatively, operations of systems and methods described herein may be performed by specific hardware components that contain fixed-function logic for performing the operations, or by any combination of programmed computer components and fixed-function hardware components.

Instructions used to program logic to perform the methods described herein can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

"Processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

Referring now to FIG. 1, shown is a block diagram of an example processing system 100 in accordance with one or more aspects of the present disclosure. As shown in FIG. 1, example processing system 100 may include a processor (such as a central processing unit (CPU)) 102 and a memory 104 that are connected to each other via an interconnect 108A. In certain implementations, processor 102 may include one or more processing cores 110. Processor 102 may execute tasks such as system applications and user applications using memory 104 to store the instructions of the programs and data associated with the programs.

In accordance with one or more aspects of the present disclosure, processing system 100 may further include a cryptographic hardware accelerator 112 communicatively coupled to processor 102 via an interconnect 108B. Cryptographic hardware accelerator 112 may be further communicatively coupled to memory 104 via an interconnect 108C. The structure and operation of cryptographic hardware accelerator 112 are described in more details herein below.

Figure 2:
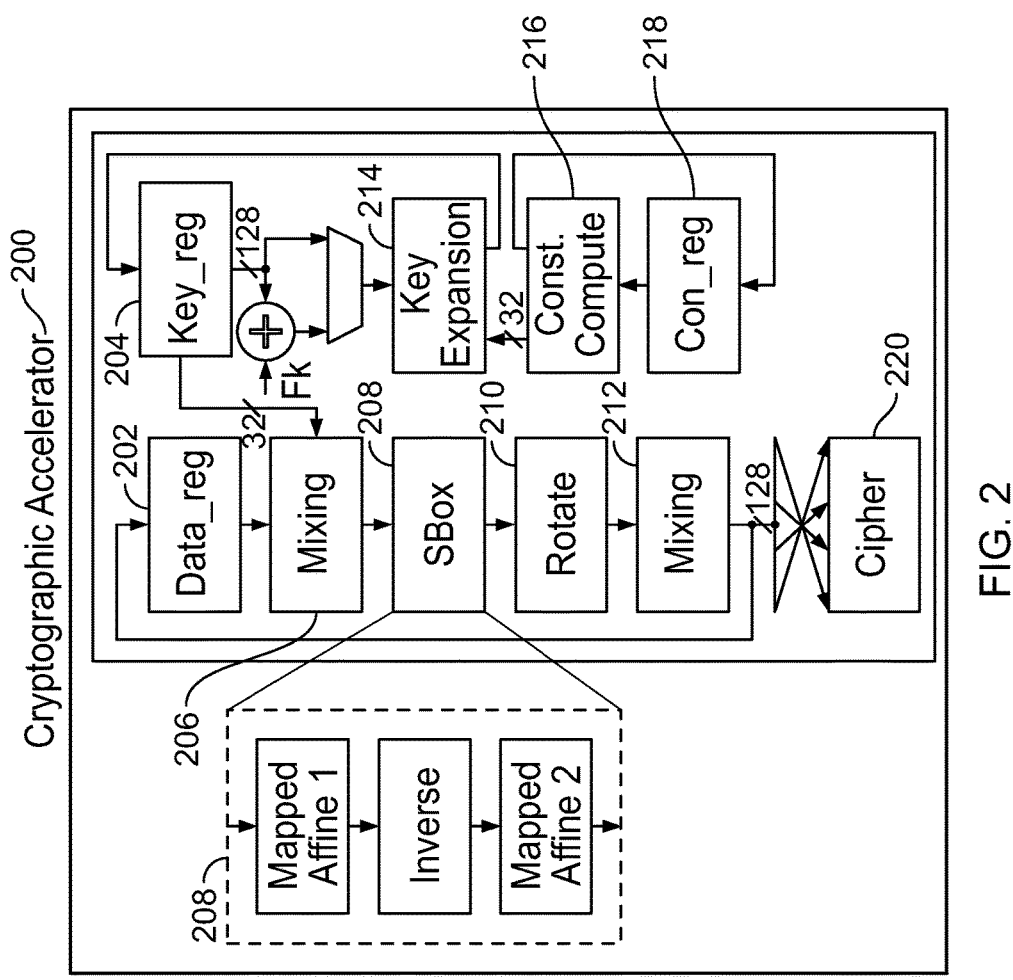
FIG. 2 schematically illustrates a block diagram of a cryptographic hardware accelerator implementing cryptographic operations, in accordance with one or more aspects of the present disclosure.

FIG. 2 schematically illustrates a block diagram of a cryptographic hardware accelerator implementing cryptographic operations in accordance with one or more aspects of the present disclosure. In various illustrative examples, cryptographic hardware accelerator 200 of FIG. 2 corresponds to cryptographic hardware accelerator 112 of FIG. 1. In certain implementations, the systems and methods described herein may be employed for implementing various cryptographic methods (such as SMS4 or AES).

As schematically illustrated by FIG. 2, cryptographic hardware accelerator 200 may include a data register 202 for storing a plurality of bits of the round state and a key register 204 for storing a plurality of bits of the round key. In an illustrative example, the higher order 32 bits from the key are mixed with the round state by mixing module 206, and the resulting 32-bit word is processed by an S-box 208. The output of the S-box is rotated by a rotation module 210, and subsequently mixed with the round state by a mixing module 212 to create a new set of four words that repeatedly go through round iterations. Each iteration uses a new key that is derived from the previous key using a similar set of mixing, S-box, and rotate operations. Following the final round, the four state bytes are used to generate the final cipher output 220.

The key expansion operation for each round is implemented by a key expansion module 214. The key expansion involves adding a 32-bit round constant to the key value. The round constant is produced by a constant compute module 218 using the values stored in a constant register 218. The key-expansion operation for the first round involves an addition of a 128-bit system constant (Fk).

The input and output of S-box 208 are elements of a Galois field $GF(2^8)$, which may be viewed as a set of 256 8-bit integers with certain operations defined on those integers. In common implementations, the S-box may be implemented by performing two affine transformations with an intervening inverse transformation, which may be represented by the following equation:

$$S(x)=A_2(A_1x+C_1)^{-1}+C_2, \qquad (1)$$

wherein $S(x)$ denotes the S-box, $A_1$ and $A_2$ are binary transformation matrices, and $C_1$ and $C_2$ are binary vectors. Thus, $Y=A_1x+C_1$ describes the first affine transformation, $Z=Y^{-1}$ describes the intervening inverse transformation, and $A_2Z+C_2$ describes the second affine transformation. FIG. 3 schematically illustrates example transformation matrices 302 and vectors 304, and a corresponding reduction polynomial 306 that may be employed in implementing the S-box using the equation (1).

As directly performing an inverse transformation in $GF(2^8)$ may present significant computational complexity, a more efficient technique involves using composite-field arithmetic. In an illustrative example, the S-box input in $GF(2^8)$ is represented as a 2-term polynomial $sh*x+sl$, where coefficients sh and sl are represented by 4-bit elements of $GF(2^4)$ field. This composite field conversion may be achieved by applying a mapping transformation (M) to the inputs. The inverse computation may then be performed in the composite $GF(2^4)^2$ field, and the result may be mapped back to $GF(2^8)$ by applying an inverse mapping transform $(M^{-1})$. Then, the second affine transform may be performed to generate the S-box output.

Figure 4:
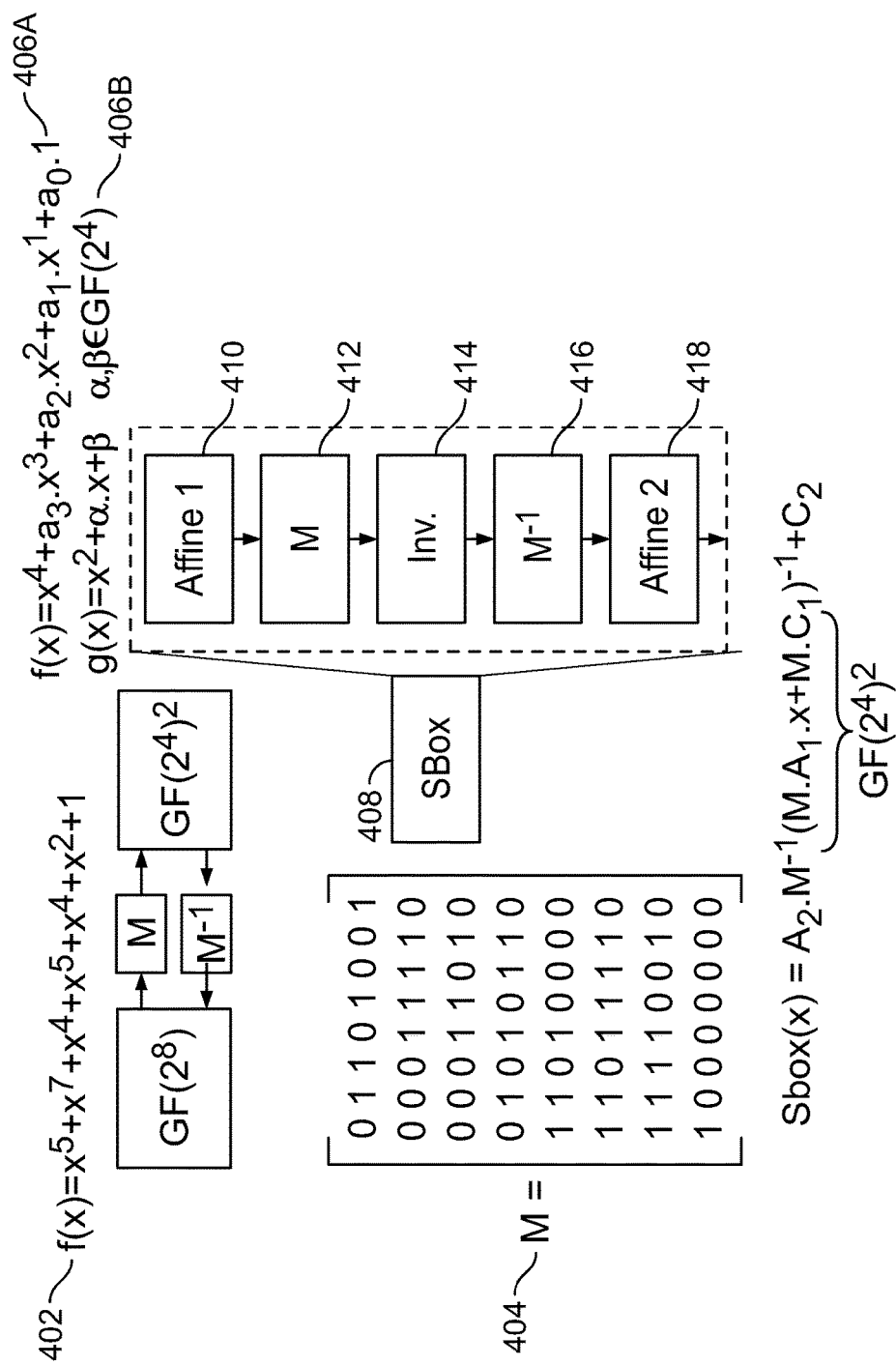
FIG. 4 schematically illustrates a mapping matrix for transforming the prime-field $GF(2^8)$ to a composite-field $GF(2^4)^2$, in accordance with one or more aspects of the present disclosure.

As schematically illustrated by FIG. 4, prime-field $GF(2^8)$ associated with a reduction polynomial 402 may be transformed to composite-field $GF(2^4)^2$ using a mapping matrix 404 associated with a pair of reduction polynomials 406A-406B. As further schematically illustrated by FIG. 4, S-box 408 may be implemented by a sequence of a first affine transformation 410, followed by a mapping transformation 412 from the prime-field to the composite-field of the prime-field, followed by an inverse transformation 414, followed by an inverse-mapping transformation 416 from the composite-field back to the prime-field, and finally followed by a second affine transformation 418:

$$S(x)=A_2M^{-1}(MA_1x+MC_1)^{-1}+C_2, \qquad (2)$$

wherein the inverse transformation is performed in the composite field $GF(2^4)^2$.

In accordance with one or more aspects of the present disclosure, the mapping (M) and inverse-mapping $(M^{-1})$ matrices of equation (2) may be merged into the affine matrices ($A_1$ and $A_2$), thus eliminating the overhead related to performing the mapping and reverse mapping operations. FIG. 5 schematically illustrates example transformation matrices 502A-502B and vector 514 that may be employed to implement an S-box in accordance with one or more aspects of the present disclosure.

Figure 6:
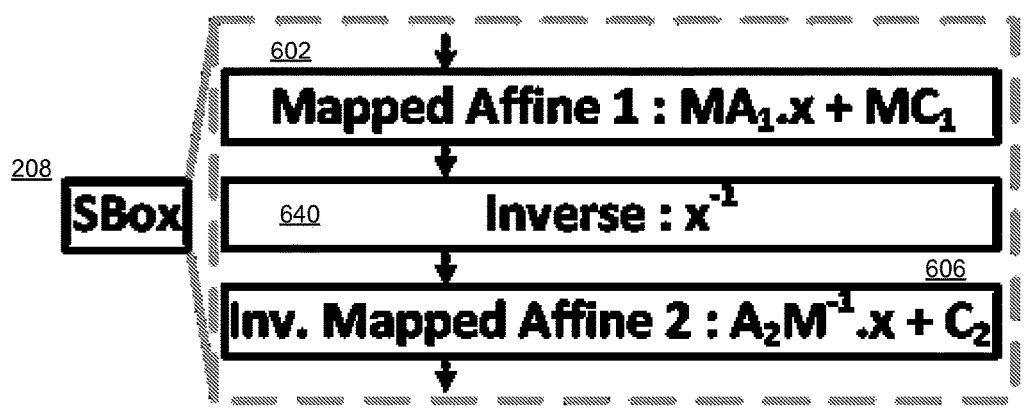
FIG. 6 schematically illustrates an example implementation of an S-box using the mapping and inverse-mapping matrices that are merged into the respective affine matrices, in accordance with one or more aspects of the present disclosure.

FIG. 6 schematically illustrates an example implementation of an S-box implementation using the mapping (M) and inverse-mapping $(M^{-1})$ matrices that are merged into the respective affine matrices ($A_1$ and $A_2$), in accordance with one or more aspects of the present disclosure. As schematically illustrated by FIG. 6, the output of S-box 208 may be determined by performing a first mapped affine transformation 602 followed by an inverse transformation 604 of the result of mapped affine transformation 602, and finally followed by a second mapped affine transformation 606 of the result of reverse transformation 604.

Implementing the S-box hardware accelerator in accordance with one or more aspects of the present disclosure may involve identifying ground-field and composite-field polynomials producing the optimal hardware accelerator area.

Figure 7:
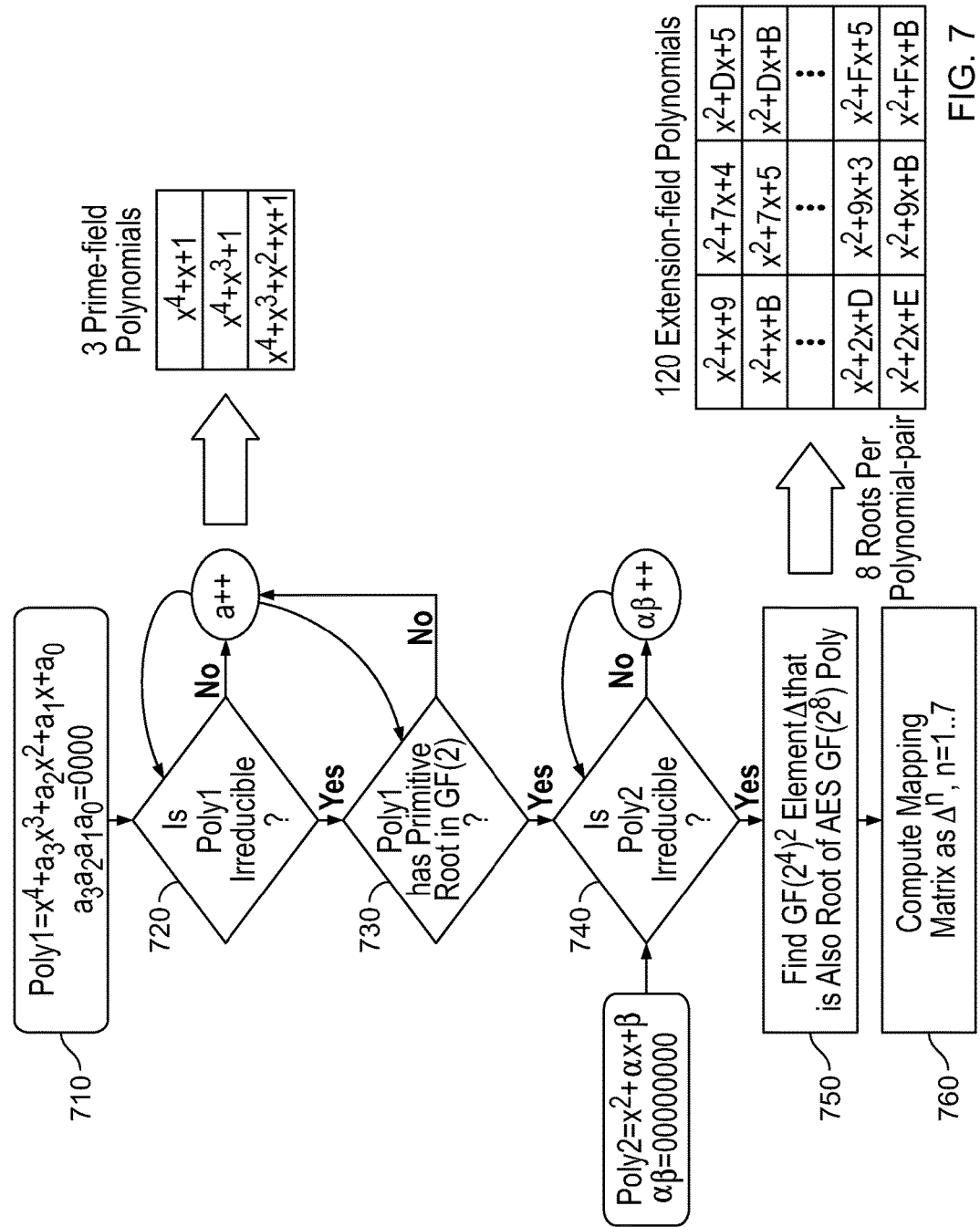
FIG. 7 schematically illustrates evaluating possible combinations of polynomials in a composite-field of the prime field $GF(2^8)$, in accordance with one or more aspects of the present disclosure.

FIG. 7 schematically illustrates evaluating possible combinations of polynomials in a composite-field of the prime field $GF(2^8)$, in accordance with one or more aspects of the present disclosure. The polynomial selection method may evaluate all possible combinations of polynomials and systematically select the polynomials that are eligible for the composite field arithmetic. At blocks 710-740, the method may select polynomials that have the properties of irreducibility, with primitive roots in the prime field. This eliminates 13 of the prime-field polynomials, leaving three candidate polynomials. A similar check, at blocks 740-770, on the composite-field polynomial selects 120 out of 276 polynomials, thereby yielding 360 polynomial combinations that are valid for use.

In each combination, a composite field element may be identified that is also a root of the original $GF(2^8)$ polynomial. This root may be used to generate, at block 760, the mapping matrix M and subsequently the mapped affine matrices $MA_1$ and $MA_2$. Each pair of reduction polynomials generates eight roots, yielding 2880 valid mappings, wherein each mapping corresponds to a unique S-box. A mapping matrix producing the least hardware accelerator area may then be selected.

Figure 8:
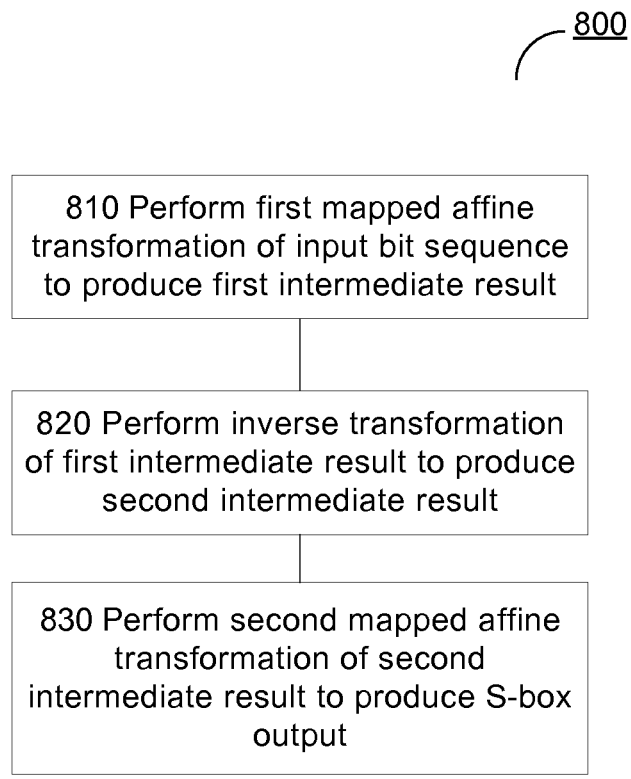
FIG. 8 depicts a flow diagram of an example method of performing a cryptographic operation (such as implementing an S-box), in accordance with one or more aspects of the present disclosure.

FIG. 8 depicts a flow diagram of an example method 800 of performing a cryptographic operation (such as implementing an S-box), in accordance with one or more aspects of the present disclosure. Method 800 may be performed by a processing system that may comprise hardware (e.g., circuitry, dedicated logic, and/or programmable logic), software (e.g., instructions executable on a computer system to perform hardware simulation), or a combination thereof. In an illustrative example, method 800 may be performed by processing system 100 of FIG. 1. Method 800 and/or each of its functions, routines, subroutines, or operations may be performed by one or more processors of a computer system executing the method. Two or more functions, routines, subroutines, or operations of method 800 may be performed in parallel or in an order which may differ from the order described above.

Referring to FIG. 8, method 800 may start at block 810, where the processing system implementing the method may perform a first mapped affine transformation of an input bit sequence to produce a first intermediate bit sequence. The first mapped affine transformation may comprise multiplying the input bit sequence by a matrix represented by a product of a mapping matrix (M) and a first transformation matrix ($A_1$). The first transformation matrix may be associated with a pair of reduction polynomials of a finite field, such as $GF(2^8)$, as described in more details herein above.

At block 820, the processing system implementing the method may perform an inverse transformation of the first intermediate bit sequence to produce a second intermediate bit sequence), as described in more details herein above.

At block 830, the processing system implementing the method may perform a second mapped affine transformation of the second intermediate bit sequence to produce an output bit sequence. The mapping matrix may represent a mapping from the chosen finite prime-field, such as $GF(2^8)$, to a composite-field of the chosen finite prime-field), as described in more details herein above.

FIG. 9 depicts a flow diagram of an example method 900 for identifying an S-box implementation having an optimal area design, in accordance with one or more aspects of the present disclosure. Method 900 may be performed by a processing system that may comprise hardware (e.g., circuitry, dedicated logic, and/or programmable logic), software (e.g., instructions executable on a computer system to perform hardware simulation), or a combination thereof. In an illustrative example, method 900 may be performed by processing system 100 of FIG. 1. Method 900 and/or each of its functions, routines, subroutines, or operations may be performed by one or more processors of a computer system executing the method. Two or more functions, routines, subroutines, or operations of method 900 may be performed in parallel or in an order which may differ from the order described above.

Referring to FIG. 9, method 900 may start at block 910, where the processing system implementing the method may identify a first plurality of irreducible polynomials associated with a finite-prime field, such that each identified polynomial has primitive roots in the finite-prime field, as described in more details herein above.

At block 920, the processing system implementing the method may identify a second plurality of irreducible polynomials associated with a composite-field of the finite-prime field, such that each identified polynomial has primitive roots in the composite-field, as described in more details herein above.

At block 930, the processing system implementing the method may identify, using a plurality of combinations of a first polynomial of the first plurality of polynomials and a second polynomial of the second plurality of polynomials, a plurality of composite-field elements, such that the identified composite-field element represents a root of a reduction polynomial associated with the finite-prime field, as described in more details herein above.

At block 940, the processing system implementing the method ma generate, using the identified plurality of composite-field elements, a plurality of mapping matrices and associated mapped affine matrices, as described in more details herein above.

At block 950, the processing system implementing the method may identify an S-box implementation using a mapping matrix of the generated plurality of mapping matrices, such that the identified S-box implementation has the minimal area design among a plurality of S-box implementations, as described in more details herein above.

Although various systems and methods are described herein with reference to specific integrated circuits, such as processors, other implementations may be applicable to other types of integrated circuits and logic devices. Techniques and teachings of systems and methods described herein may be applied to other types of circuits or semiconductor devices that may also benefit from better energy efficiency and energy conservation. For example, the disclosed implementations are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications may include a microcontroller, a digital signal processor (DSP), network computers (NetPC), set-top boxes, network hubs, wide area network (WAN) switches, or any other system that can perform the functions and operations taught below. Moreover, the systems and methods described herein are not limited to physical computing devices, but may also relate to software-implemented methods. Power savings realized by systems and methods described herein may be independent of and complementary to an operating system (OS)-based mechanism, such as the Advanced Configuration and Platform Interface (ACPI) standard.

The methods and systems described herein above may be implemented by computer system of various architectures, designs and configurations for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable to implement the methods described herein. In general, a large variety of systems or electronic devices capable of incorporating a processor and/or other execution logic as disclosed herein are generally suitable for implementing the systems and methods described herein.

Figure 10:
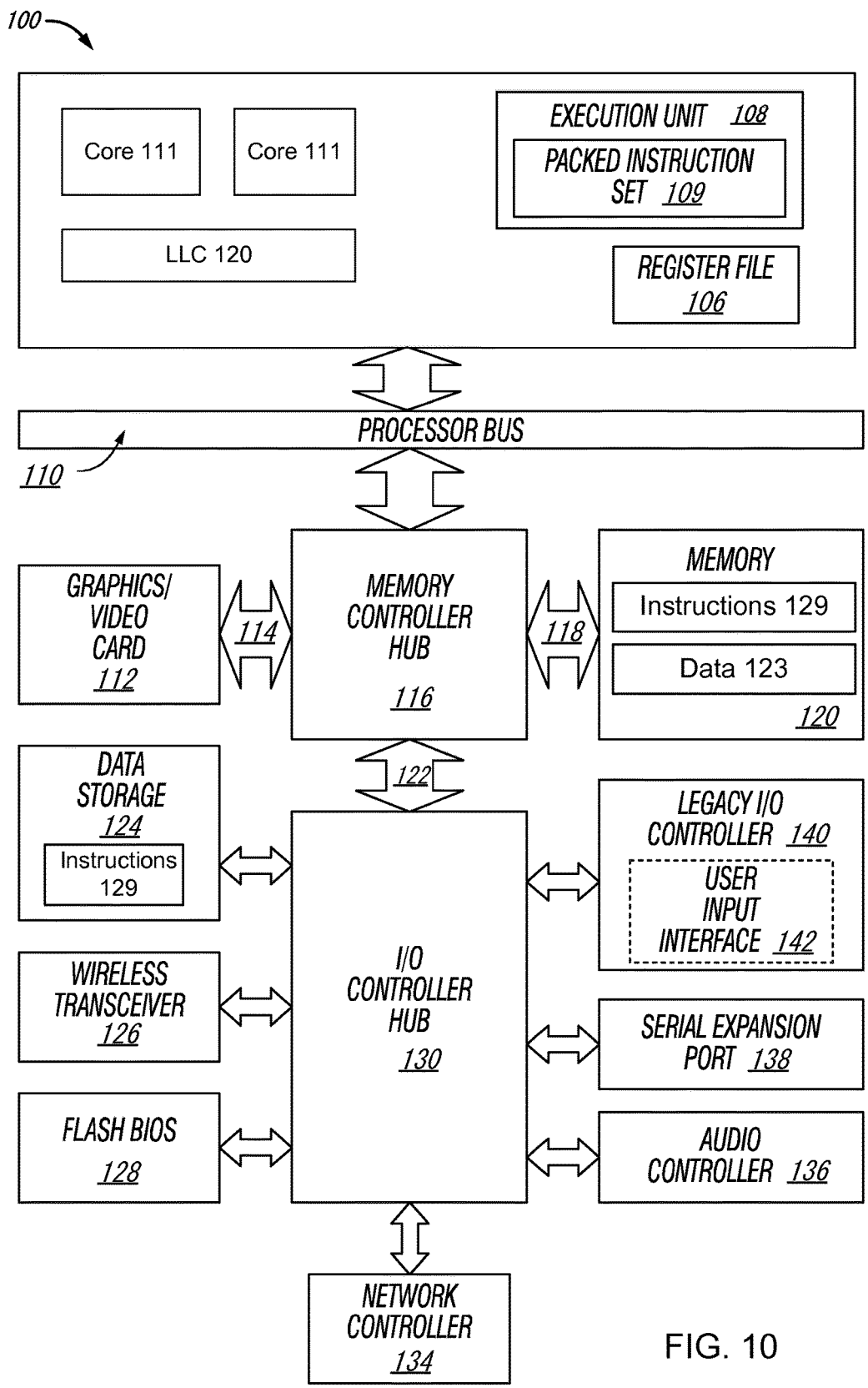
FIG. 10 depicts a high-level component diagram of an example computer system, in accordance with one or more aspects of the present disclosure.

FIG. 10 depicts a high-level component diagram of one example of a computer system in accordance with one or more aspects of the present disclosure. A computer system 100 may include a processor 110 to employ execution units including logic to perform algorithms for processing data, in accordance with the embodiment described herein. System 100 is representative of processing systems based on the PENTIUM III™, PENTIUM 4™, Xeon™, Itanium, XScale~ and/or StrongARM™ microprocessors available from Intel Corporation of Santa Clara, Calif., although other systems (including PCs having other microprocessors, engineering workstations, set-top boxes and the like) may also be used. In certain implementations, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments described herein are not limited to any specific combination of hardware circuitry and software.

In an illustrative example, processor 110 includes one or more execution units 108 to implement an algorithm that is to perform at least one instruction. One embodiment may be described in the context of a single processor desktop or server system, but alternative embodiments may be included in a multiprocessor system. System 100 is an example of a 'hub' system architecture. The computer system 100 includes a processor 110 to process data signals. The processor 110, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 110 is coupled to a processor bus 110 that transmits data signals between the processor 110 and other components in the system 100. The elements of system 100 (e.g. graphics accelerator 112, memory controller hub 116, memory 120, I/O controller hub 124, wireless transceiver 126, Flash BIOS 128, Network controller 134, Audio controller 136, Serial expansion port 138, I/O controller 140, etc.) perform their conventional functions that are well known to those familiar with the art.

In certain implementations, the processor 110 includes a Level 1 (L1) internal cache. Depending on the architecture, the processor 110 may have a single internal cache or multiple levels of internal caches. Other embodiments include a combination of both internal and external caches depending on the particular implementation and needs. Register file 106 is to store different types of data in various registers including integer registers, floating point registers, vector registers, banked registers, shadow registers, checkpoint registers, status registers, and instruction pointer register.

Execution unit 108, including logic to perform integer and floating point operations, also resides in the processor 110. The processor 110, in certain implementations, includes a microcode (ucode) ROM to store microcode, which when executed, is to perform algorithms for certain macroinstructions or handle complex scenarios. Here, microcode is potentially updateable to handle logic bugs/fixes for processor 110. For one embodiment, execution unit 108 includes logic to handle a packed instruction set 109. By including the packed instruction set 109 in the instruction set of a general-purpose processor 110, along with associated circuitry to execute the instructions, the operations used by many multimedia applications may be performed using packed data in a general-purpose processor 110. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time. Alternate embodiments of an execution unit 108 may also be used in micro controllers, embedded processors, graphics devices, DSPs, and other types of logic circuits. In certain implementations, the processor 110 may further include a cache control logic 124, the functioning of which is described in more details herein below.

System 100 includes a memory 120. Memory 120 includes a dynamic random access memory (DRAM) device, a static random access memory (SRAM) device, flash memory device, or other memory device. Memory 120 stores instructions 129 and/or data 123 represented by data signals that are to be executed by the processor 110. In certain implementations, instructions 129 may include instructions employing the cache control logic 124 for managing shared cache, as described in more details herein below.

A system logic chip 116 is coupled to the processor bus 110 and memory 120. The system logic chip 116 in the illustrated embodiment is a memory controller hub (MCH). The processor 110 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 110, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 110. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 11:
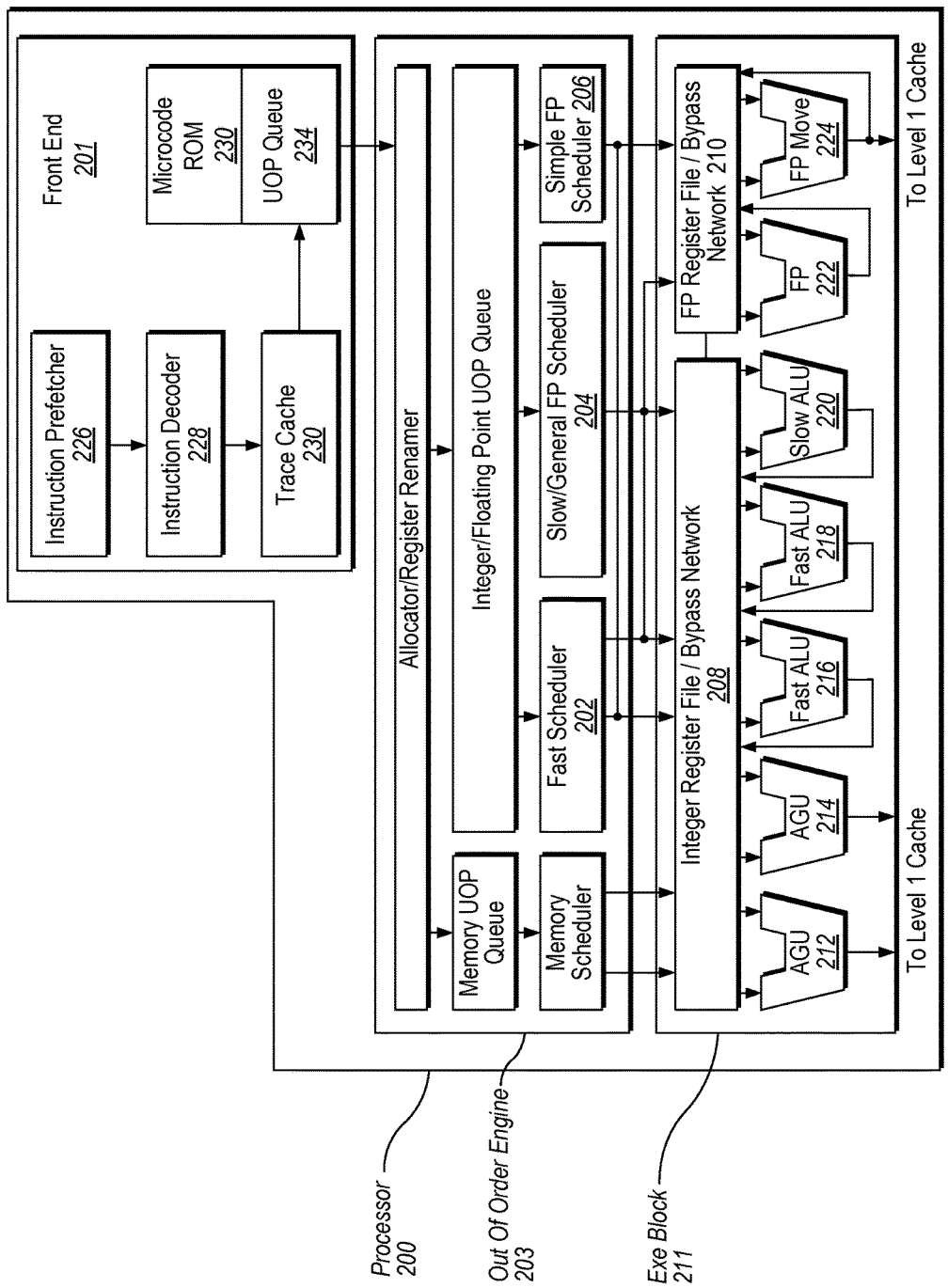
FIG. 11 depicts a block diagram of a processor, in accordance with one or more aspects of the present disclosure.

FIG. 11 is a block diagram of the micro-architecture for a processor 200 that includes logic circuits to perform instructions in accordance with one or more aspects of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In certain implementations the in-order front end 201 is the part of the processor 200 that fetches instructions to be executed and prepares them to be used later in the processor pipeline. The front end 201 may include several units. In certain implementations, the instruction prefetcher 226 fetches instructions from memory and feeds them to an instruction decoder 228 which in turn decodes or interprets them. For example, in certain implementations, the decoder decodes a received instruction into one or more operations called "micro-instructions" or "micro-operations" (also referred to as uops) that the machine can execute. In other embodiments, the decoder parses the instruction into an opcode and corresponding data and control fields that are used by the micro-architecture to perform operations in accordance with one embodiment. In certain implementations, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In certain implementations, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register aliasing logic maps logical registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206 determine when a uop is ready to execute based on the readiness of their dependent input register operand sources and the availability of the execution resources the uops need to complete their operation. The fast scheduler 202 of one embodiment can schedule on each half of the main clock cycle while the other schedulers can schedule once per main processor clock cycle. The schedulers arbitrate for the dispatch ports to schedule uops for execution.

Physical register files 208, 210 sit between the schedulers 202, 204, 206, and the execution units 212, 214, 216, 218, 220, 222, 224 in the execution block 211. There is a separate register file 208, 210 for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For systems and methods described herein, instructions involving a floating point value may be handled with the floating point hardware. In certain implementations, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220 are described in the context of performing integer operations on 64 bit data operands. In alternative embodiments, the ALUs 216, 218, 220 can be implemented to support a variety of data bits including 16, 32, 128, 256, etc. Similarly, the floating point units 222, 224 can be implemented to support a range of operands having bits of various widths. For one embodiment, the floating point units 222, 224 can operate on 128 bits wide packed data operands in conjunction with SIMD and multimedia instructions.

In certain implementations, the uops schedulers 202, 204, 206 dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register aliasing, combinations of dedicated and dynamically allocated physical registers, etc. In certain implementations, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In certain implementations, in storing packed data and integer data, the registers do not need to differentiate between the two data types. In certain implementations, integer and floating point are either contained in the same register file or different register files. Furthermore, in certain implementations, floating point and integer data may be stored in different registers or the same registers.

Figure 12:
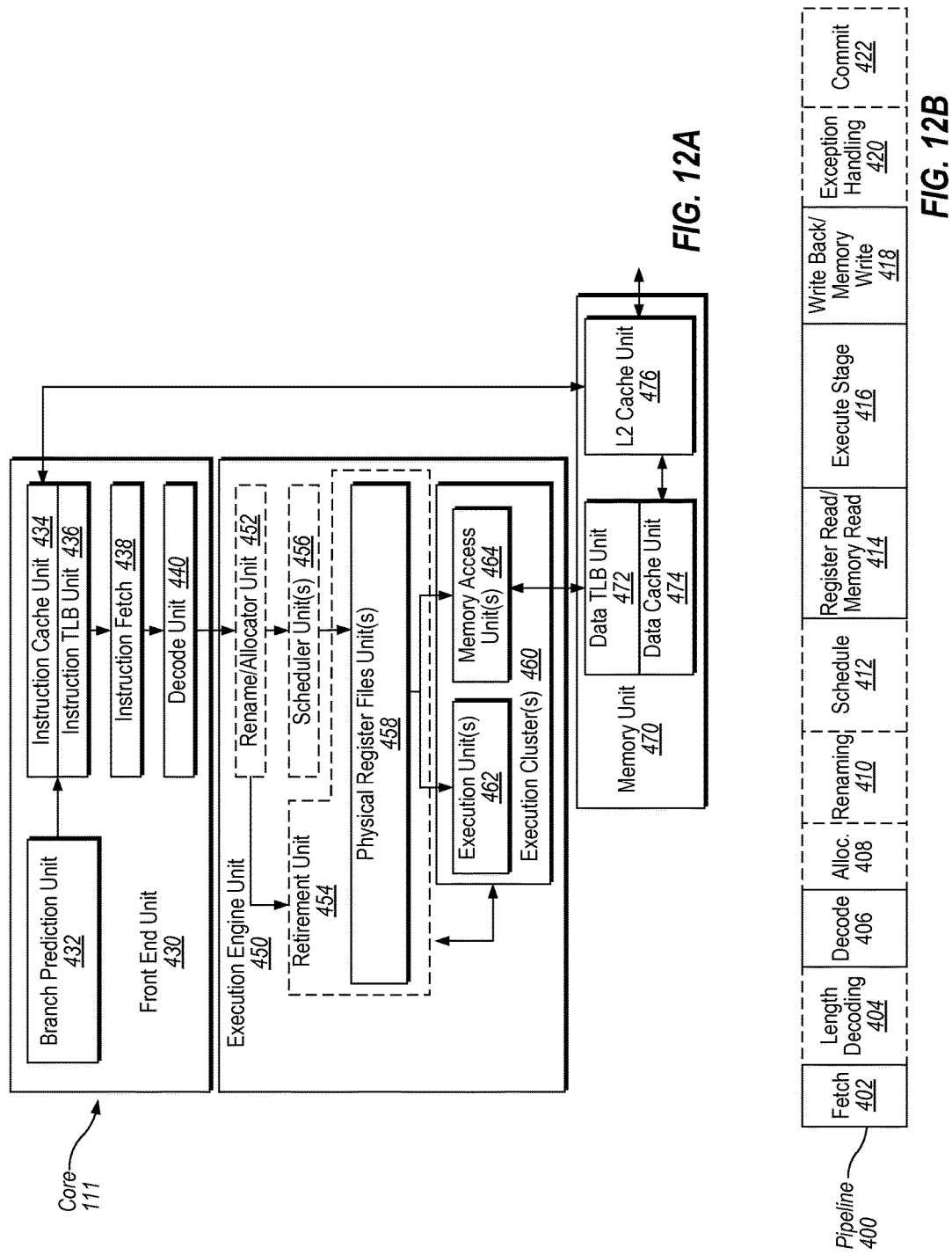
FIGS. 12A-12B schematically illustrates elements of a processor micro-architecture, in accordance with one or more aspects of the present disclosure.

FIGS. 12A-12B schematically illustrates elements of a processor micro-architecture, in accordance with one or more aspects of the present disclosure. In FIG. 12A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 12B, arrows denote a coupling between two or more units and the direction of the arrow indicates a direction of data flow between those units. FIG. 12B shows processor core 111 including a front end unit 430 coupled to an execution engine unit 450, and both are coupled to a memory unit 470.

The core 111 may be a reduced instruction set computing (RISC) core, a complex instruction set computing (CISC) core, a very long instruction word (VLIW) core, or a hybrid or alternative core type. As yet another option, the core 111 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register aliasing and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register aliasing, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register aliasing, out-of-order issue/execution core architecture may implement the pipeline 400 as follows: the instruction fetch 438 performs the fetch and length decoding stages 402 and 404; the decode unit 440 performs the decode stage 406; the rename/allocator unit 452 performs the allocation stage 408 and renaming stage 410; the scheduler unit(s) 456 performs the schedule stage 412; the physical register file(s) unit(s) 458 and the memory unit 470 perform the register read/memory read stage 414; the execution cluster 460 perform the execute stage 416; the memory unit 470 and the physical register file(s) unit(s) 458 perform the write back/memory write stage 418; various units may be involved in the exception handling stage 422; and the retirement unit 454 and the physical register file(s) unit(s) 458 perform the commit stage 424.

The core 111 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

In certain implementations, the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register aliasing is described in the context of out-of-order execution, it should be understood that register aliasing may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

In certain implementations, processor core 111 may be designed as an out-of-order (OOO) core in order to improve the performance by executing instructions as soon as their operands become available, rather than in the program order. However, the performance benefit may be offset by a considerable increase in the power consumption. When multiple execution threads are available for the operating system to schedule, employing multiple in-order cores rather than large OOO cores may improve the energy consumption profile of the processor without compromising the overall performance. Thus, to improve the performance and energy consumption scalability of a processor, the latter may be designed to support a variable number of cores depending on the performance needs and the number of threads available to the operating system for scheduling.

Figure 13:
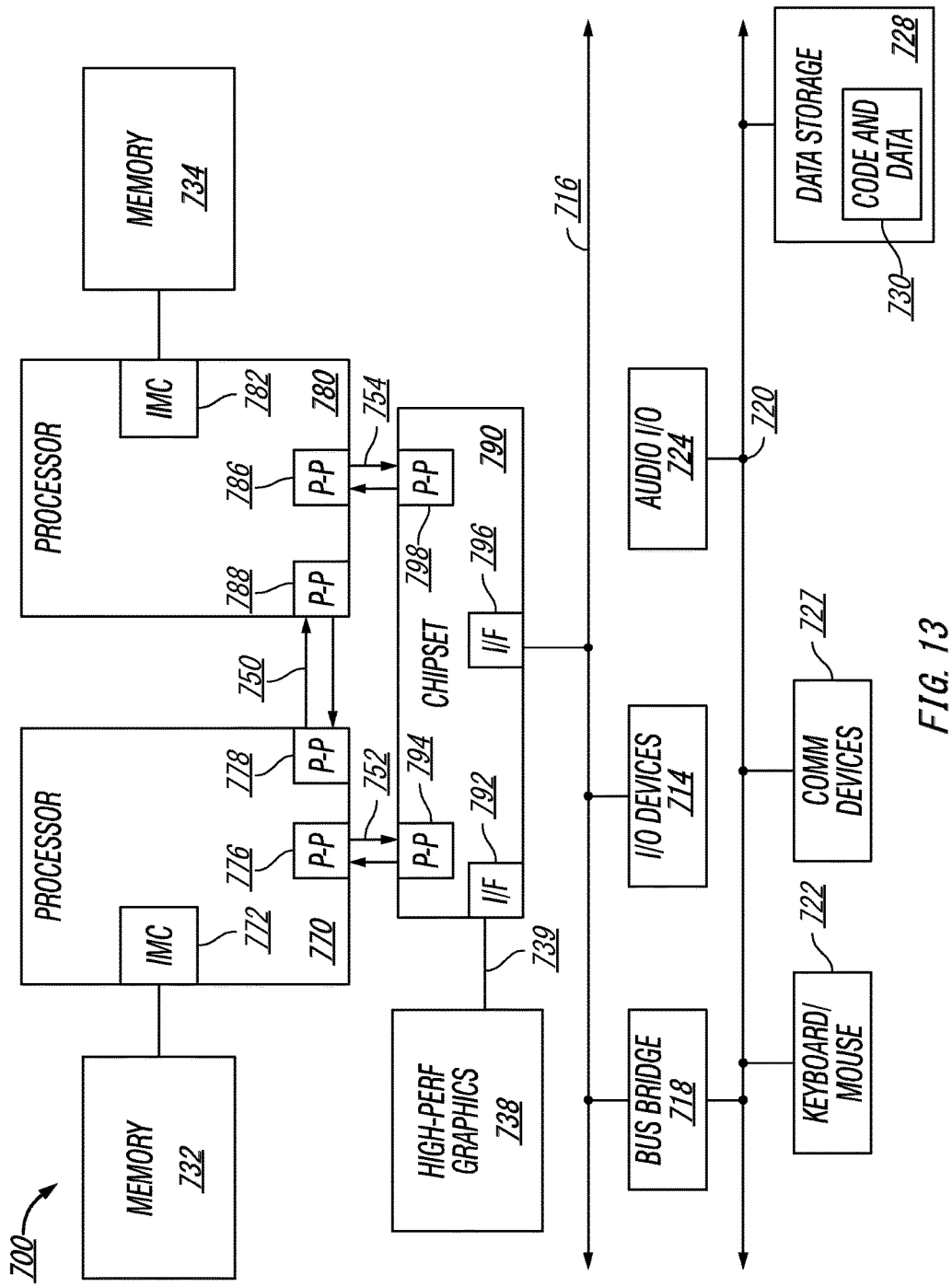
FIG. 13 depicts a block diagram of an example computer system, in accordance with one or more aspects of the present disclosure.

FIG. 13 depicts a block diagram of an example computer system, in accordance with one or more aspects of the present disclosure. As shown in FIG. 13, multiprocessor system 700 is a point-to-point interconnect system, and includes a first processor 770 and a second processor 780 coupled via a point-to-point interconnect 750. Each of processors 770 and 780 may be some version of processing system 100 capable of performing memory protection for implementing trusted execution environment, as described in more details herein above. While shown with only two processors 770, 780, it is to be understood that the scope of the present disclosure is not so limited. In other embodiments, one or more additional processors may be present in the example computer system.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 13, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In certain implementations, first bus 716 may be a Peripheral Component Interconnect (PCI) bus, or a bus such as a PCI Express bus or another third generation I/O interconnect bus, although the scope of the present disclosure is not so limited.

As shown in FIG. 13, various I/O devices 714 may be coupled to first bus 716, along with a bus bridge 718 which couples first bus 716 to a second bus 720. In certain implementations, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in certain implementations. Further, an audio I/O 724 may be coupled to second bus 720.

Figure 14:
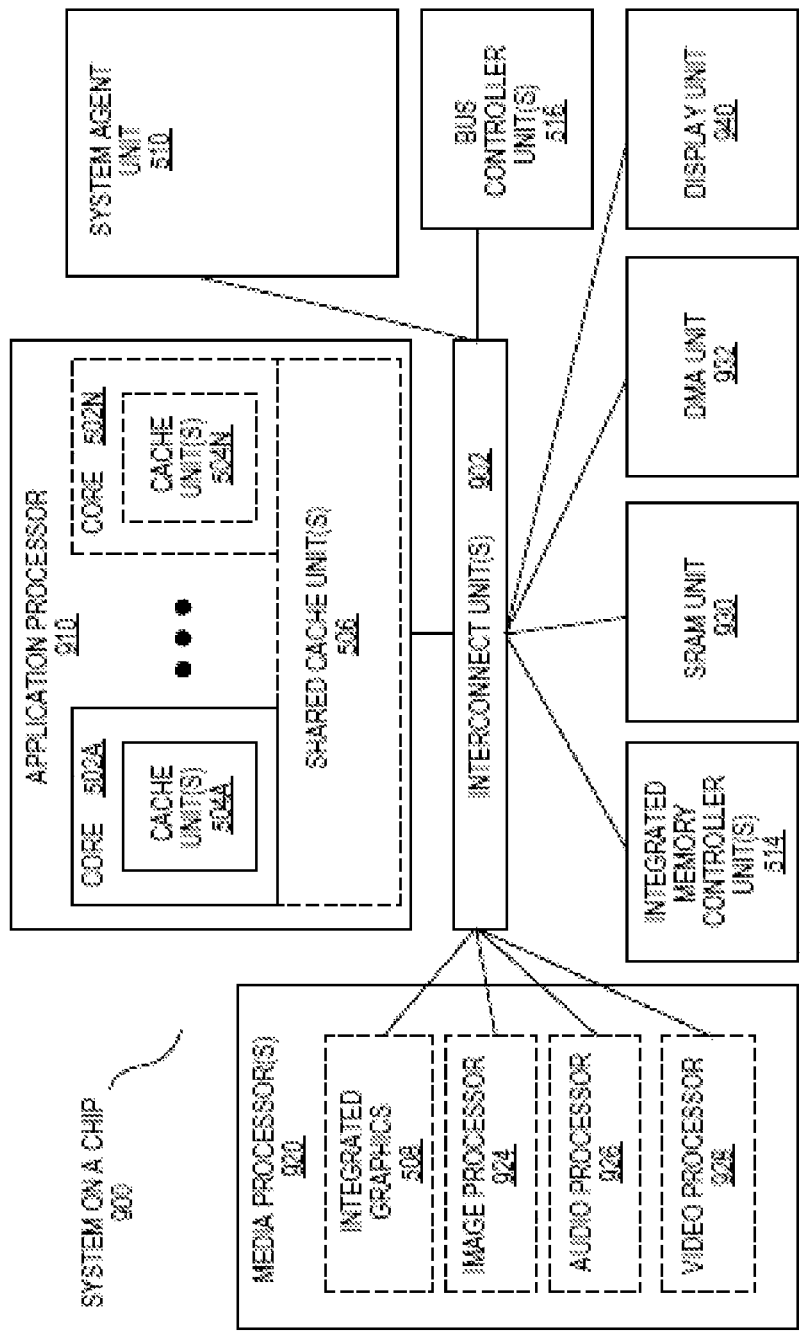
FIG. 14 depicts a block diagram of an example system on a chip (SoC), in accordance with one or more aspects of the present disclosure.

FIG. 14 depicts a block diagram of an example system on a chip (SoC), in accordance with one or more aspects of the present disclosure. The application processor 910 provided by some version of processing system 100 capable of performing memory protection for implementing trusted execution environment, as described in more details herein above. As schematically illustrated by FIG. 14, interconnect unit(s) 902 may be coupled to: an application processor 910 which includes a set of one or more cores 902A-N and shared cache unit(s) 906; a system agent unit 910; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 15:
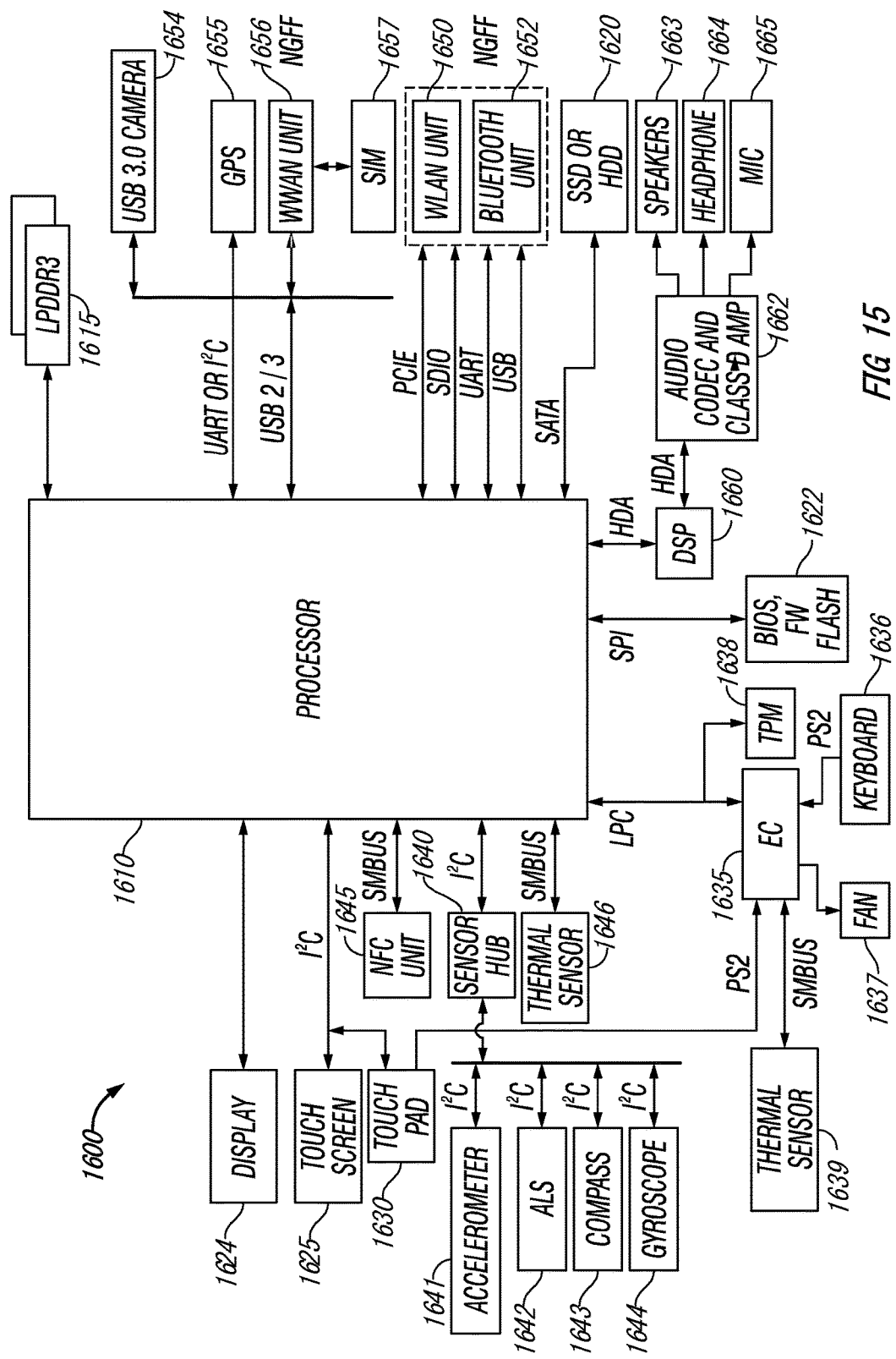
FIG. 15 depicts a block diagram of an example computer system, in accordance with one or more aspects of the present disclosure.

FIG. 15 depicts a block diagram of an example computer system, in accordance with one or more aspects of the present disclosure. Processor 1610 may be provided by some version of processing system 100 capable of performing memory protection for implementing trusted execution environment, as described in more details herein above.

The system 1600 schematically illustrated by FIG. 15 may include any combination of components implemented as ICs, portions thereof, discrete electronic devices, or other modules, logic, hardware, software, firmware, or a combination thereof adapted in a computer system, or as components otherwise incorporated within a chassis of the computer system. The block diagram of FIG. 15 is intended to show a high level view of many components of the computer system. However, it is to be understood that some of the components shown may be omitted, additional components may be present, and different arrangement of the components shown may occur in other implementations.

Processor 1610 may be provided by a microprocessor, multi-core processor, multithreaded processor, an ultra low voltage processor, an embedded processor, or other known processing element. In the illustrated implementation, processor 1610 acts as a main processing unit and central hub for communication with many of the various components of the system 1600. As one example, processor 1600 may be implemented as a system on a chip (SoC). As a specific illustrative example, processor 1610 includes an Intel® Architecture Core™-based processor such as an i3, i5, i7 or another such processor available from Intel Corporation, Santa Clara, Calif.

Processor 1610 may communicate with a system memory 1615. In various implementations the individual memory devices may be of different package types such as single die package (SDP), dual die package (DDP) or quad die package (1P). These devices, in some implementations, may be directly soldered onto a motherboard to provide a lower profile solution, while in other implementations the devices may be configured as one or more memory modules that in turn couple to the motherboard by a given connector. Other memory implementations are possible, such as other types of memory modules, e.g., dual inline memory modules (DIMMs) of different varieties including but not limited to microDIMMs, MiniDIMMs. In one illustrative example, the memory may be sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1620 may be also coupled to processor 1610. In certain implementations, to enable a thinner and lighter system design as well as to improve system responsiveness, the mass storage 1620 may be implemented via a SSD. In other implementations, the mass storage may primarily be provided by a hard disk drive (HDD) with a smaller amount of SSD storage to act as a SSD cache to enable non-volatile storage of context state and other such information during power down events so that a fast power up can occur on re-initiation of system activities.

Also shown in FIG. 15, a flash device 1622 may be coupled to processor 1610, e.g., via a serial peripheral interface (SPI). The flash device 1622 may provide for non-volatile storage of system software, including a basic input/output software (BIOS) as well as other firmware of the system.

In various implementations, the mass storage of the system may be provided by a SSD alone or as a disk, optical or other drive with an SSD cache. In some implementations, the mass storage may be provided by an SSD or as a HDD along with a restore (RST) cache module. The SSD cache may be configured as a single level cache (SLC) or multi-level cache (MLC) option to provide an appropriate level of responsiveness.

Various input/output (IO) devices may be present within system 1600, including, e.g., a display 1624 which may be provided by a high definition LCD or LED panel configured within a lid portion of the chassis. This display panel may also provide for a touch screen 1625 adapted externally over the display panel such that via a user's interaction with this touch screen, user inputs can be provided to the system to enable desired operations, e.g., with regard to the display of information, accessing of information and so forth. In certain implementations, display 1624 may be coupled to processor 1610 via a display interconnect that can be implemented as a high performance graphics interconnect. Touch screen 1625 may be coupled to processor 1610 via another interconnect, which in an embodiment can be an I2C interconnect. In addition to touch screen 1625, user input by way of touch can also occur via a touch pad 1630 which may be configured within the chassis and may also be coupled to the same I2C interconnect as touch screen 1625.

Various sensors may be present within the system and may be coupled to processor 1610 in different manners. Certain inertial and environmental sensors may couple to processor 1610 through a sensor hub 1640, e.g., via an I2C interconnect. These sensors may include an accelerometer 1641, an ambient light sensor (ALS) 1642, a compass 1643 and a gyroscope 1644. Other environmental sensors may include one or more thermal sensors 1646 which in some embodiments couple to processor 1610 via a system management bus (SMBus) bus. In certain implementations, one or more infrared or other heat sensing elements, or any other element for sensing the presence or movement of a user may be present.

Various peripheral devices may couple to processor 1610 via a low pin count (LPC) interconnect. In certain implementations, various components can be coupled through an embedded controller 1635. Such components can include a keyboard 1636 (e.g., coupled via a PS2 interface), a fan 1637, and a thermal sensor 1639. In some embodiments, touch pad 1630 may also couple to EC 1635 via a PS2 interface. In addition, a security processor such as a trusted platform module (TPM) 1638 in accordance with the Trusted Computing Group (TCG) TPM Specification Version 1.2, dated Oct. 2, 2003, may also couple to processor 1610 via this LPC interconnect.

In certain implementations, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1600 can communicate with external devices in a variety of manners, including wirelessly. In the embodiment shown in FIG. 16, various wireless modules, each of which can correspond to a radio configured for a particular wireless communication protocol, are present. One manner for wireless communication in a short range such as a near field may be via a near field communication (NFC) unit 1645 which may communicate, in certain implementations with processor 1610 via an SMBus.

Additional wireless units can include other short range wireless engines including a WLAN unit 1650 and a Bluetooth unit 1652. Using WLAN unit 1650, Wi-Fi™ communications in accordance with a given Institute of Electrical and Electronics Engineers (IEEE) 802.11 standard can be realized, while via Bluetooth unit 1652, short range communications via a Bluetooth protocol can occur. These units may communicate with processor 1610 via, e.g., a USB link or a universal asynchronous receiver transmitter (UART) link. Or these units may couple to processor 1610 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1656 which in turn may couple to a subscriber identity module (SIM) 1657. In addition, to enable receipt and use of location information, a GPS module 1655 may also be present.

To provide for audio inputs and outputs, an audio processor can be implemented via a digital signal processor (DSP) 1660, which may couple to processor 1610 via a high definition audio (HDA) link. Similarly, DSP 1660 may communicate with an integrated coder/decoder (CODEC) and amplifier 1662 that in turn may couple to output speakers 1663 which may be implemented within the chassis. Similarly, amplifier and CODEC 1662 can be coupled to receive audio inputs from a microphone 1665.

Figure 16:
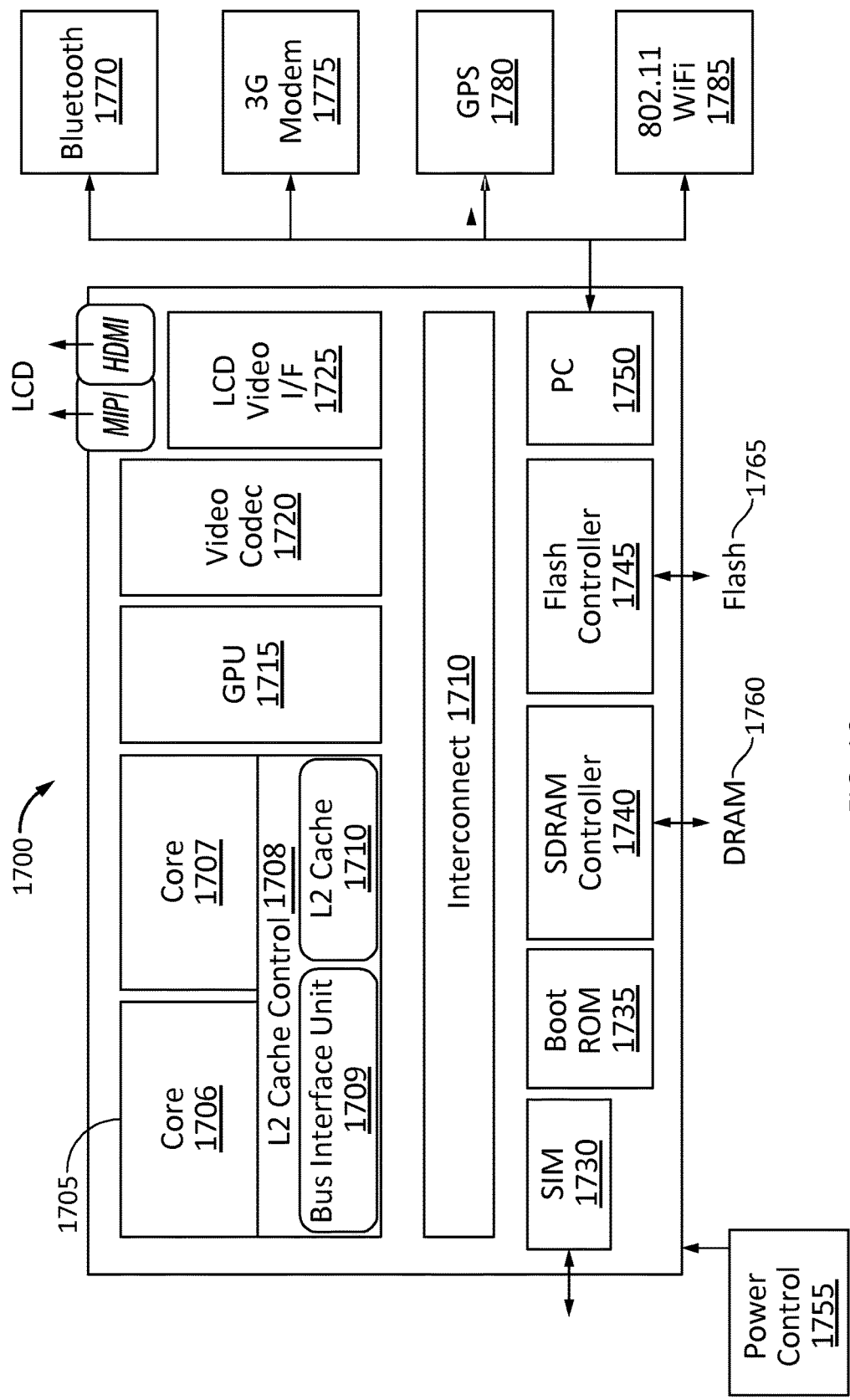
FIG. 16 depicts a block diagram of an example system on a chip (SoC), in accordance with one or more aspects of the present disclosure.

FIG. 16 depicts a block diagram of an example system on a chip (SoC), in accordance with one or more aspects of the present disclosure. As a specific illustrative example, SOC 1700 may be included in user equipment (UE). In certain implementations, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

As schematically illustrated by FIG. 16, SOC 1700 may include two cores. Cores 1706 and 1707 may be coupled to cache control 1708 that is associated with bus interface unit 1709 and L2 cache 1710 to communicate with other parts of system 1700. Interconnect 1710 may include an on-chip interconnect, such as an IOSF, AMBA, or other interconnect.

Interface 1710 may provide communication channels to the other components, such as a Subscriber Identity Module (SIM) 1730 to interface with a SIM card, a boot ROM 1735 to hold boot code for execution by cores 1706 and 1707 to initialize and boot SOC 1700, a SDRAM controller 1740 to interface with external memory (e.g., DRAM 1760), a flash controller 1745 to interface with non-volatile memory (e.g., flash 1765), a peripheral control 1550 (e.g., Serial Peripheral Interface) to interface with peripherals, video codecs 1720 and Video interface 1725 to display and receive input (e.g., touch enabled input), GPU 1715 to perform graphics related computations, etc. In addition, the system may comprise peripherals for communication, such as a Bluetooth module 1770, 3G modem 1775, GPS 1785, and WiFi 1785.

Other computer system designs and configurations may also be suitable to implement the systems and methods described herein. The following examples illustrate various implementations in accordance with one or more aspects of the present disclosure.

Example 1 is a processing system, comprising: a memory; a cryptographic accelerator module operatively coupled to the memory, the cryptographic accelerator module to implement a byte substitute operation by performing: a first mapped affine transformation of an input bit sequence to produce a first intermediate bit sequence, an inverse transformation of the first intermediate bit sequence to produce a second intermediate bit sequence, and a second mapped affine transformation of the second intermediate bit sequence to produce an output bit sequence.

Example 2 is the processing system of Example 1, in which the first mapped affine transformation is represented by a matrix produced by multiplying a mapping matrix and a first transformation matrix.

Example 3 is a processing system of Example 2, in which the first transformation matrix is associated with a pair of reduction polynomials of a finite field.

Example 4 is a processing system of Example 2, in which at least one of the input bit sequence and the output bit sequence is provided by an element of a finite prime-field, and in which the mapping matrix represents a mapping from the finite prime-field to a composite-field of the finite prime-field.

Example 5 is a processing system of Example 4, in which the finite prime-field is represented by a GF(28) Galois field.

Example 6 is a processing system of Example 4, in which the composite-field is represented by a GF(24)2 Galois field.

Example 7 is a processing system of Example 1, in which the second mapped affine transformation is represented by a matrix produced by multiplying a mapping matrix and a second transformation matrix.

Example 8 is a processing system of Example 1, in which the processing system is employed to perform one of: an SMS4 encryption operation or an SMS4 decryption operation.

Example 9 is a processing system of Example 1, in which the processing system is implemented as a System-on-Chip (SoC).

Example 10. A method, comprising: performing, by a processing device, a first mapped affine transformation of an input bit sequence to produce a first intermediate bit sequence; performing an inverse transformation of the first intermediate bit sequence to produce a second intermediate bit sequence; and performing a second mapped affine transformation of the second intermediate bit sequence to produce an output bit sequence.

Example 11 is a method of Example 10, in which the first mapped affine transformation is represented by a matrix produced by multiplying a mapping matrix and a first transformation matrix.

Example 12 is a method of Example 11, in which the first transformation matrix is associated with a pair of reduction polynomials of a finite field.

Example 13 is a method of Example 11, in which at least one of the input bit sequence and the output bit sequence is provided by an element of a finite prime-field, and in which the mapping matrix represents a mapping from the finite prime-field to a composite-field of the finite prime-field.

Example 14 is a method of Example 13, in which the finite prime-field is represented by a GF(28) Galois field.

Example 15 is a method of Example 13, in which the composite-field is represented by a GF(24)2 Galois field.

Example 16 is a method of Example 10, further comprising: performing a cryptographic operation using the output bit sequence.

Example 17. An apparatus comprising: a memory; and a processing system coupled to the memory, the processing system to perform the method of any of Examples 10-16.

Example 18. A computer-readable non-transitory storage medium comprising executable instructions that, when executed by a processing device, cause the processing device to perform operations, comprising: performing a first mapped affine transformation of an input bit sequence to produce a first intermediate bit sequence; performing an inverse transformation of the first intermediate bit sequence to produce a second intermediate bit sequence; and performing a second mapped affine transformation of the second intermediate bit sequence to produce an output bit sequence.

Example 19 is a computer-readable non-transitory storage medium of Example 18, in which the first mapped affine transformation is represented by a matrix produced by multiplying a mapping matrix and a first transformation matrix.

Example 20 is a computer-readable non-transitory storage medium of Example 19, in which the first transformation matrix is associated with a pair of reduction polynomials of a finite field.

Example 21 is a computer-readable non-transitory storage medium of Example 18, in which at least one of the input bit sequence and the output bit sequence is provided by an element of a finite prime-field, and in which the mapping matrix represents a mapping from the finite prime-field to a composite-field of the finite prime-field.

Example 22 is a computer-readable non-transitory storage medium of Example 21, in which the finite prime-field is represented by a GF(28) Galois field.

Example 23 is a computer-readable non-transitory storage medium of Example 21, in which the composite-field is represented by a GF(24)2 Galois field.

Example 24 is a computer-readable non-transitory storage medium of Example 18, in which the second mapped affine transformation is represented by a matrix produced by multiplying a mapping matrix and a second transformation matrix.

Example 25. A method, comprising: identifying a first plurality of irreducible polynomials associated with a finite-prime field, wherein each identified polynomial has primitive roots in the finite-prime field; identifying a second plurality of irreducible polynomials associated with a composite-field of the finite-prime field, wherein each identified polynomial has primitive roots in the composite-field; identifying, using a plurality of combinations of a first polynomial of the first plurality of polynomials and a second polynomial of the second plurality of polynomials, a plurality of composite-field elements, wherein each identified composite-field element represents a root of a reduction polynomial associated with the finite-prime field; and generating, using the identified plurality of composite-field elements, a plurality of mapping matrices and associated mapped affine matrices.

Example 26 is a method of Example 25, further comprising: identifying an S-box implementation using a mapping matrix of the generated plurality of mapping matrices, in which the identified S-box implementation has a minimal area design among a plurality of S-box implementations.

Example 27 is a method of Example 26, further comprising: performing a cryptographic operation using the identified S-box implementation.

Example 28 is a method of Example 25, in which the composite-field is represented by a GF(24)2 Galois field.

Example 29. An apparatus comprising: a memory; and a processing system coupled to the memory, the processing system to perform the method of any of Examples 25-28.

Example 30. A computer-readable non-transitory storage medium comprising executable instructions that, when executed by a processing system, cause the processing system to perform operations, comprising: identifying a first plurality of irreducible polynomials associated with a finite-prime field, wherein each identified polynomial has primitive roots in the finite-prime field; identifying a second plurality of irreducible polynomials associated with a composite-field of the finite-prime field, wherein each identified polynomial has primitive roots in the composite-field; identifying, using a plurality of combinations of a first polynomial of the first plurality of polynomials and a second polynomial of the second plurality of polynomials, a plurality of composite-field elements, wherein each identified composite-field element represents a root of a reduction polynomial associated with the finite-prime field; and generating, using the identified plurality of composite-field elements, a plurality of mapping matrices and associated mapped affine matrices.

Example 31. The computer-readable non-transitory storage medium of Example 30, further comprising: identifying an S-box implementation using a mapping matrix of the generated plurality of mapping matrices, in which the identified S-box implementation has a minimal area design among a plurality of S-box implementations.

Example 32. The computer-readable non-transitory storage medium of Example 30, in which the finite prime-field is represented by a GF(28) Galois field.

33. The computer-readable non-transitory storage medium of Example 30, in which the composite-field is represented by a GF(24)2 Galois field.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

The invention claimed is:

1. A processing system for performing a cryptographic operation comprising a byte substitution operation, the processing system comprising:
   a memory device;
   a cryptographic accelerator module operatively coupled to the memory device, the cryptographic accelerator module to implement the byte substitute operation by performing:
   a first mapped affine transformation of an input bit sequence to produce a first intermediate bit sequence, wherein the first mapped affine transformation is represented by a first mapped affine transformation matrix produced by multiplying a first mapping matrix and a first transformation matrix,
   an inverse transformation of the first intermediate bit sequence to produce a second intermediate bit sequence, and
   a second mapped affine transformation of the second intermediate bit sequence to produce an output bit sequence.

2. The processing system of claim 1, wherein the first transformation matrix is associated with a pair of reduction polynomials of a finite field.

3. The processing system of claim 1, wherein at least one of the input bit sequence and the output bit sequence is provided by an element of a finite prime-field, and wherein the first mapping matrix represents a mapping from the finite prime-field to a composite-field of the finite prime-field.

4. The processing system of claim 3, wherein the finite prime-field is represented by a $GF(2^8)$ Galois field.

5. The processing system of claim 3, wherein the composite-field is represented by a $GF(2^4)^2$ Galois field.

6. The processing system of claim 1, wherein the second mapped affine transformation is represented by a second mapped affine transformation matrix produced by multiplying a second mapping matrix and a second transformation matrix.

7. The processing system of claim 1, wherein the processing system is employed to perform cryptographic operation is represented by one of: an SMS4 encryption operation or an SMS4 decryption operation.

8. The processing system of claim 1, wherein the processing system is implemented as a System-on-Chip (SoC).

9. A method, comprising: performing, by a cryptographic accelerator module, a byte substitution operation comprising:
   a first mapped affine transformation of an input bit sequence to produce a first intermediate bit sequence, wherein the first mapped affine transformation is represented by a first mapped affine transformation matrix produced by multiplying a first mapping matrix and a first transformation matrix,
   an inverse transformation of the first intermediate bit sequence to produce a second intermediate bit sequence, and
   a second mapped affine transformation of the second intermediate bit sequence to produce an output bit sequence; and performing a cryptographic operation using the output bit sequence.

10. The method of claim 9, wherein the first transformation matrix is associated with a pair of reduction polynomials of a finite field.

11. The method of claim 9, wherein at least one of the input bit sequence and the output bit sequence is provided by an element of a finite prime-field, and wherein the first mapping matrix represents a mapping from the finite prime-field to a composite-field of the finite prime-field.

12. The method of claim 11, wherein the finite prime-field is represented by a $GF(2^8)$ Galois field.

13. The method of claim 11, wherein the composite-field is represented by a $GF(2^4)^2$ Galois field.

14. The method of claim 9, further comprising:
performing a cryptographic operation using the output bit sequence.

* * * * *